United States Patent Office 3,291,393
Patented Dec. 13, 1966

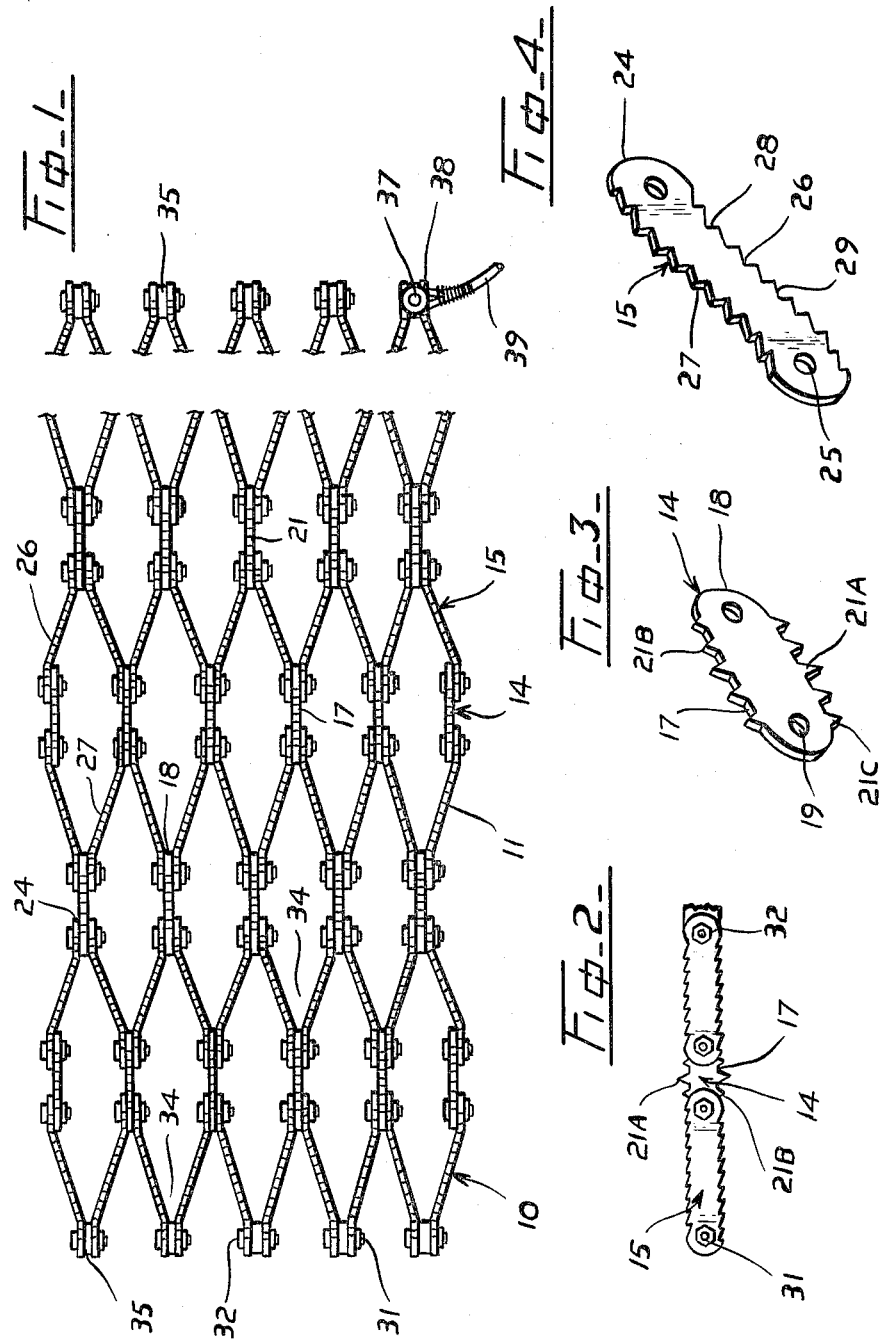

3,291,393
TRACTION MAT
Ian A. May, 1329 Pemberton Ave., North Vancouver, British Columbia, Canada
Filed Apr. 13, 1964, Ser. No. 359,347
1 Claim. (Cl. 238—14)

My invention relates to a traction device for automobiles and other vehicles.

The present mat is intended for use when a car becomes stalled in mud, sand, snow or ice. Under such conditions normally all that is required to extricate the vehicle is additional traction for only a short period of time. This provides the car with sufficient momentum to enable it to move over the slippery ground without further assistance.

The objects of this invention are to provide such a mat which will afford adequate traction between the tire and the mat surface as well as between the underside of the mat and the ground surface. Very often the spinning driving wheels of a car will dig themselves into quite a deep rut and a further object is to ensure that the mat is sufficiently flexible to conform readily to the contour of both the rut and the tire. A further object is to provide the mat with a large number of parts which are hinged together in such a way that the mat, when lodged beneath a tire and against the curved wall of a rut, is formed into a many sided trough with each side serving as a driving lug for the tire. Loss of traction is most often encountered on hard ice where even the conventional tire chains will tend to slip and a still further object of the present invention is to provide a device having special teeth which will ensure tire-to-mat and mat-to-ground traction on ice or hard ground.

These and other objects as well as other features and advantages will be fully described in the following specification and be shown in the accompanying drawing.

Referring to the drawing:

FIGURE 1 is a plan of the invention, part broken away.

FIGURE 2 is a side elevation of the front edge portion of the mat.

FIGURE 3 is a perspective view of a link.

FIGURE 4 is a perspective view of a bar.

The numeral 10 indicates generally a rectangular strip which preferably is some eight inches in width and two feet or more in length. This strip is in the form of a lattice made up of a number of articulated sections 11. The sections are arranged in longitudinal and transverse rows with the number of sections in alternate transverse rows differing from one an other by one. A plurality of links 14 and bars 15 make up the section of the open mesh strip.

As shown best in FIG. 3, the links 14 consist of a thin metal band having side edges 17 and rounded ends 18. The ends 18 are radiused about transverse openings 19. Both the side edges of the link are provided with teeth 21 which are triangular and of graduated height. The centre teeth 21A project the greatest distance from the edges 17 while the intermediate teeth 21B and end teeth 21C are progressively decreased in height.

Referring particularly to FIG. 4, it will be seen that the bars 15 consist of a length of metal which is offset so that its rounded ends 24 are disposed parallel to one another. The ends 24 are provided with central openings 25 corresponding to the openings 19 in the links. The side edges 26 are both notched or serrated as at 27 with each serration having a vertical face 28 and a sloping face 29. It will be noted that the faces 29 of the serrations along one edge of the bar slope downwardly on one side of the faces 28 and that the faces 29 on the other side slope in the opposite direction. The serrations 27 are of uniform height and as shown in FIG. 2 this dimension is equal to the height of the teeth 21C on the links 14.

The links 14 and bars 15 are connected together by bolts 31 which project through the openings 19 and 25. A self-locking nut 32 is fitted to each bolt and a slight clamping pressure is applied to the connected ends by said nut and bolt. This pressure is such as to allow the links and bars to pivot about bolts 31 while offering a slight resistance to such pivotal movement. Thus the strip 10 is completely flexible but at the same time it will retain any shape into which it is molded.

The bars 15 are horizontally inclined away from the longitudinally arranged links 14. In other words the bars converge at the ends of the sections to form substantially triangular pockets 34. Along the two ends of the strip the converging bars 15 of each pocket 34 are provided with a spacer 35. This spacer is interposed between the parallel ends 24 of the bars and a bolt 31 and lock nut 32 pivotally connect the parts together as in the remainder of the mat. The spacer at one corner of the mat preferably is an eye bolt 37 fitted with a nut 38. This attachment serves as an anchor post for a length of small diameter wire or rope 39.

The traction mats normally are carried in the trunk of the car and if it is not convenient to store them flat they may be rolled up into a neat compact bundle. When slippery driving conditions are encountered or the car becomes mired in mud or snow the mats are flattened out and placed in front of each of the driving wheels. Each mat is arranged so that the edges 29 of the serrations on the upper face of the mat are sloping downwardly in the direction of rotation of the wheel. The rear edge of the strip 10 is butted against the tire and the free end of the rope 39 is temporarily attached to the rear bumper. As the wheels are rotated, the tires climb up on to the mat where adequate traction is provided by the top serrations 27. These serrations are pointed in the opposite direction on the underside of the strip so that the mat cannot be kicked out to the rear. The wheels quickly pass over the mat but sufficient momentum is imparted to the car that it may move on away from the slippery section while dragging the mat behind.

If the slipping wheel is in a rut as it would be in mud or snow the weight of the car distorts the strip 10 and molds it roughly into the shape of the tire. The side links 14 and inclined bars 15 hinge about the bolts 31 but can only do so about axes at right angles to the longitudinal axis of the strip. However the mat parts are free to swing about their pivots any required distance and this coupled with the offset in the inclined bars 15 and the staggered relationship of the links 14 allows the strip to flex into an irregular shaped trough. The strip then has a myriad of tire and ground gripping surfaces with the serrations 27 and pockets 34 also adding to the tractive power of the mat.

On very hard ice even the present mat might slip to some extent were it not for the teeth 21 on the links. These teeth bite into the ice to augment the drive and also break up or roughen the ice surface so that the car will move forward. Thus the anti-skid properties of the mat will enable the car to free itself under the poorest of driving conditions.

What I claim is:

A traction mat adapted to be interposed between a driving wheel of a vehicle and the ground, the mat comprising a rectangular lattice-like strip having a plurality of sections, each section including transversely spaced and parallel side links and inclined bars, ground contacting edges and driving wheel contacting edges of the inclined bars being provided with serrations, upper and lower edges of the side links being provided with teeth with some of said teeth projecting beyond the serrations on the inclined bars, said side links extending longitudinally of the mat and having rounded ends, said inclined bars having parallel ends and defining triangular-shaped pockets at the ends of the sections, pivot means securing the rounded ends of the side links between the parallel ends of adjoining bars, said pivot means applying a predetermined clamping pressure to the connected ends and the lattice-like strip being moldable into an irregular-shaped trough substantially conforming to the contour of a part of the driving wheel.

References Cited by the Examiner

UNITED STATES PATENTS

| | | | |
|---|---|---|---|
| 690,551 | 1/1902 | Baumgarten | 15—239 |
| 1,465,550 | 8/1923 | Hayden | 15—239 |
| 1,545,879 | 7/1925 | Campbell | 15—239 |

ARTHUR L. LA POINT, *Primary Examiner.*

R. A. BERTSCH, *Assistant Examiner.*